June 8, 1926.

H. WACHSMAN

CAGE

Filed April 24, 1925

1,588,282

*Herman Wachsman*
INVENTOR

BY *Victor J. Evans*
ATTORNEY

WITNESS:

Patented June 8, 1926.

1,588,282

UNITED STATES PATENT OFFICE.

HERMAN WACHSMAN, OF NEW YORK, N. Y.

CAGE.

Application filed April 24, 1925, Serial No. 25,647, and in Germany March 26, 1925.

This invention relates to cages and more particularly to a bird cage.

The principal object of the invention is the provision of a bird cage which is collapsible for permitting the same to be "knocked down" and arranged in a compact manner so as to take up a minimum amount of space for shipping purposes when the device is not in use.

Another object is to provide a collapsible bird cage which may be easily and quickly assembled for use, or disassembled when not in use.

A further object of the invention resides in the construction of a collapsible bird cage which is simple in construction, and which is no more expensive to manufacture than the bird cages now in use.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
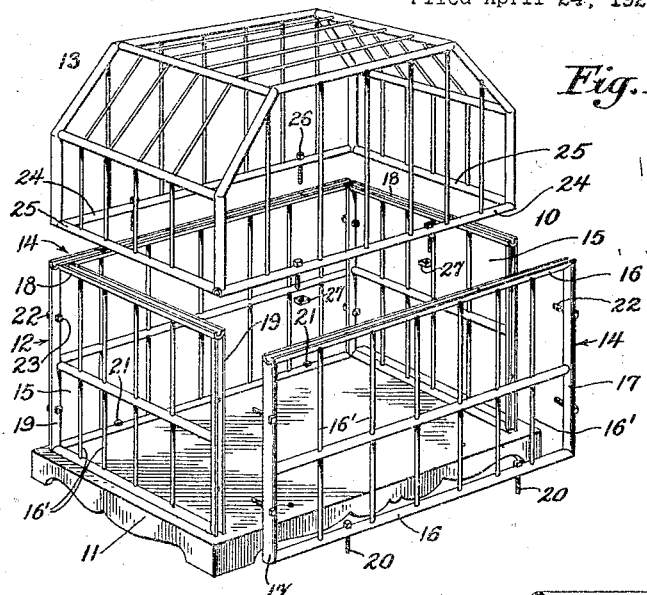
Figure 1 is a perspective view of my invention showing certain parts in separated condition.
Figure 4:
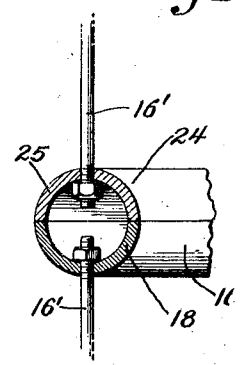
Figure 4 is an enlarged detail sectional view showing the means for fastening the parts when assembled.
Figure 2:
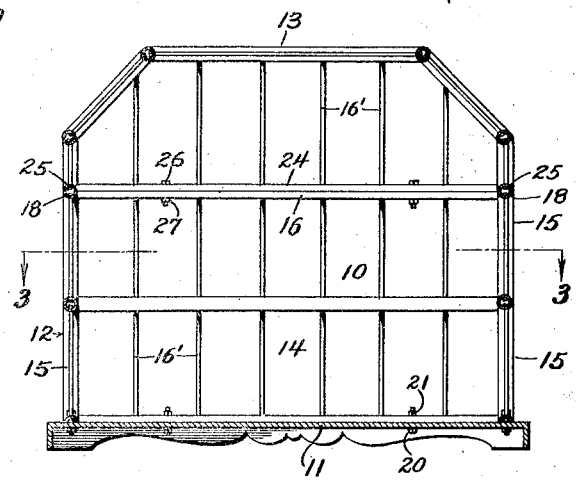
Figure 2 is a vertical longitudinal sectional view with the parts in assembled condition.
Figure 3:
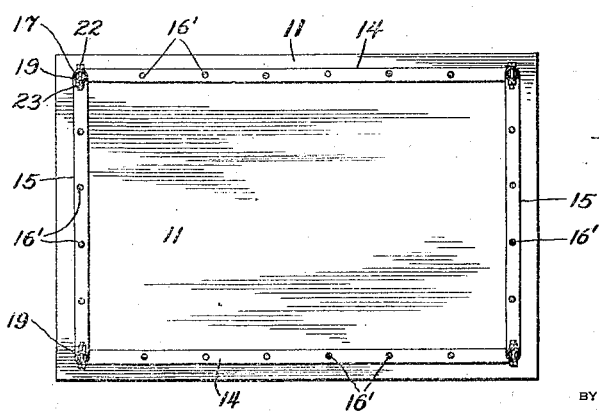
Figure 3 is a horizontal sectional view on the line 3—3 of Figure 2.

Referring more particularly to the drawing, the reference numeral 10 designates my improved bird cage in its entirety and which includes a base or tray 11, a body section 12 and a top section 13. The base section is shown as rectangular in the drawing but it is to be understood that the same may be of any suitable configuration without departing from the spirit of the invention.

The body portion 12 is supported upon the base and comprises identical side walls 14, 14, and identical end walls 15, 15, the meeting edges of which are secured together in a manner now to be described. Each side wall 14 is provided with oppositely disposed horizontal bars 16 which are connected by the usual vertical rails 16', and which are connected at their ends by vertical bars 17, 17. The bars 16 and 17 are semi-circular in cross section for co-action with the base and top section, and the end sections respectively. The end sections 15, 15, are each formed with horizontal bars 18 and vertical connecting bars 19 which are similar in cross section to the bars 16 and 17 of the side walls. The flat portions of the lower bars 16 and 18 rest upon the base 11 adjacent the edge thereof and are connected to the base by bolts 20 which pass through aligned openings in the bars and base, and which bolts receive suitable nuts 21. The meeting flat faces of the vertical bars 17 and 19 of the side and end walls co-act to give the appearance of a single bar and are also connected together by bolts 22 which pass through horizontally aligned openings in the bars, and which bolts receive retaining nuts 23.

The flat faces of the bars 16 and 19 of the side and end sections receive the similar faces on bars 24 and 25 respectively of the top section 13 and are secured together by bolts 26 passing through aligned openings and which bolts receive retaining nuts 27.

From the foregoing description, it will be seen that when the parts are all assembled in set up position, there is provided a strong and rigid structure, giving the appearance of an ordinary bird cage. When it is desired to collapse the structure, the walls 14 and 15 are detached from the base by loosening the nuts and removing the bolts, after which the top section is similarly removed. The end walls are then disconnected from the side walls by removing the bolts 23 and the walls placed flat against the base 11. The top section 13 is then placed upon the base so that the parts are arranged in stack formation, where they may be held in any suitable manner such as by tying a rope or securing a strap about the same.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A knock-down bird cage comprising a flat base, side wall sections and end wall sections, the outer rails of said sections being semi-circular in cross section to rest upon the flat base and to co-act at their meeting corners to appear as single vertical posts, removable fastening elements passing through the lower rails of said side and end wall sections and said base to vertically support said sections thereon, removable fastening elements passing through the meeting rails of said side and end wall sections, a top section of a size and shape to rest upon the top rails of said side and end sections, the marginal rails of said top section being semicircular in cross section to co-act with the similar shape rails on the top of said side and end sections, and removable fastening elements passing through the meeting rails of the top section and said side and end sections.

In testimony whereof I have affixed my signature.

HERMAN WACHSMAN.